(12) United States Patent
Allen et al.

(10) Patent No.: US 8,449,150 B2
(45) Date of Patent: May 28, 2013

(54) TIR LENS FOR LIGHT EMITTING DIODES

(75) Inventors: Steven C. Allen, Beverly, MA (US); Hong Luo, Danvers, MA (US); Angela Hohl-AbiChedid, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 500 days.

(21) Appl. No.: 12/364,934

(22) Filed: Feb. 3, 2009

(65) Prior Publication Data
US 2010/0195335 A1   Aug. 5, 2010

(51) Int. Cl.
*F21V 5/04*  (2006.01)
*F21V 3/02*  (2006.01)

(52) U.S. Cl.
USPC ......... 362/311.06; 362/311.02; 362/308; 362/327; 362/335; 362/520; 313/512

(58) Field of Classification Search
USPC ........... 362/520, 545, 244, 245, 249.02, 362/308, 311.02, 311.06, 311.15, 311.11, 362/327, 335, 339, 340; 313/512
See application file for complete search history.

(56) References Cited

U.S. PATENT DOCUMENTS

| 2,215,900 | A | * | 9/1940 | Bitner | 362/309 |
|---|---|---|---|---|---|
| 2,254,961 | A | * | 9/1941 | Harris | 362/327 |
| 2,469,080 | A | * | 5/1949 | Rosin et al. | 362/327 |
| 4,767,172 | A | * | 8/1988 | Nichols et al. | 385/146 |
| 5,526,190 | A | | 6/1996 | Hubble, III et al. | |
| 6,547,423 | B2 | * | 4/2003 | Marshall et al. | 362/333 |
| 6,582,103 | B1 | | 6/2003 | Popovich et al. | |
| 6,724,543 | B1 | * | 4/2004 | Chinniah et al. | 359/718 |
| 6,755,556 | B2 | * | 6/2004 | Gasquet et al. | 362/329 |
| 6,896,381 | B2 | * | 5/2005 | Benitez et al. | 359/858 |
| 6,953,271 | B2 | * | 10/2005 | Aynie et al. | 362/511 |
| 7,021,797 | B2 | | 4/2006 | Minano et al. | |
| 7,111,964 | B2 | * | 9/2006 | Suehiro et al. | 362/328 |
| 7,270,454 | B2 | * | 9/2007 | Amano | 362/522 |
| 7,329,029 | B2 | | 2/2008 | Chaves et al. | |
| 7,473,013 | B2 | * | 1/2009 | Shimada | 362/327 |
| 7,847,480 | B2 | * | 12/2010 | Yoneda et al. | 313/512 |
| 2005/0201118 | A1 | | 9/2005 | Godo | |
| 2008/0054281 | A1 | | 3/2008 | Narendran et al. | |
| 2008/0062703 | A1 | | 3/2008 | Cao | |

OTHER PUBLICATIONS

European Search Report and Annex for corresponding European Patent Application 10152400.7, mailed Jun. 28, 2010, Applicant: Osram Sylvania Inc.

* cited by examiner

*Primary Examiner* — Ismael Negron
(74) *Attorney, Agent, or Firm* — Shaun P. Montana

(57) ABSTRACT

An optical element is disclosed. The optical element includes a single, transparent, rotationally-symmetric lens with a batwing shaped cross-section, extending angularly away from a longitudinal axis. The lens also includes a variety of curved, straight, specular and optionally diffuse portions on its longitudinal and transverse faces, all of which cause a variety of internal and external reflections, refractions, and optionally scattering.

7 Claims, 8 Drawing Sheets

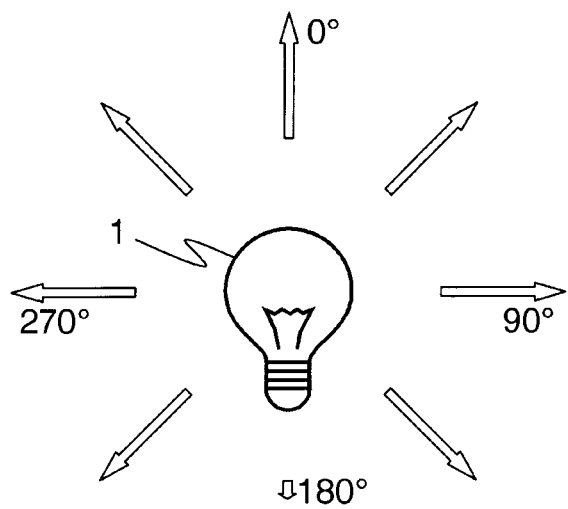
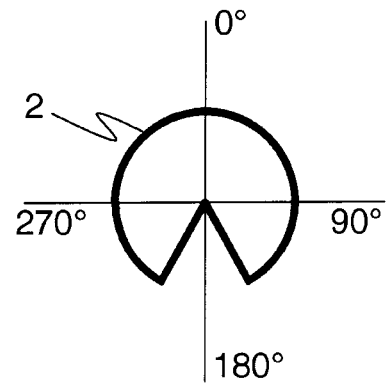
Fig. 1
PRIOR ART
Fig. 2
PRIOR ART
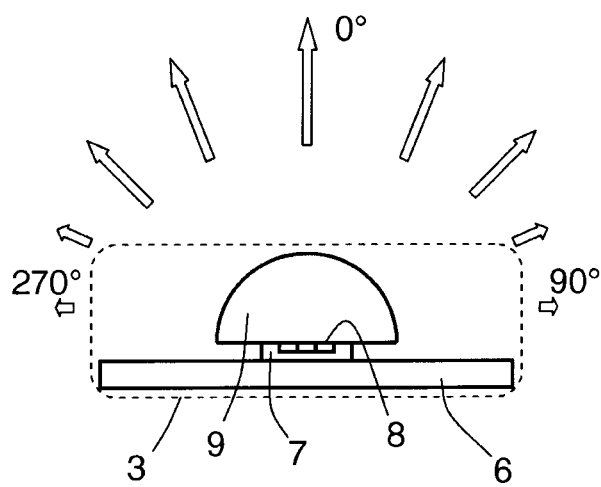
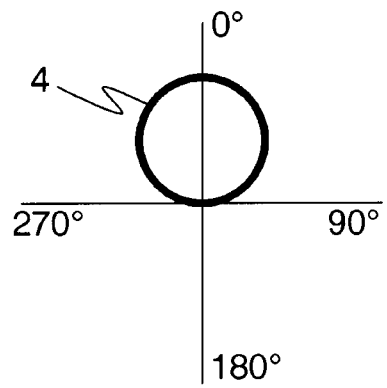
Fig. 3
PRIOR ART
Fig. 4
PRIOR ART

TIR LENS FOR LIGHT EMITTING DIODES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention is directed to an optical element for receiving relatively narrow light from a planar light-emitting diode (LED) source, and for redistributing the light into a relatively wide range of output angles that span a full 360 degrees.

2. Description of the Related Art

Light emitting diodes (LEDs) are rapidly finding acceptance in many lighting applications. Compared with incandescent light bulbs, LEDs are more efficient, have longer lifetimes, and may be packaged in a wide variety of suitably shaped and sized packages.

The cone of light emerging from a typical LED is rather narrow. While this may be a desirable characteristic for some applications, such as spotlights, there are other applications where it may be desirable to have a wider angular output. In particular, there are "retrofit" applications that replace incandescent bulbs with LEDs. These "retrofit" applications would use LEDs or LED arrays as their light sources, but would condition the light output to mimic that of a typical incandescent bulb. In this manner, a user can keep an existing lighting fixture, and can realize some of the benefits of using LEDs.

It is instructive to examine in detail the angular light output from typical incandescent bulbs and typical LEDs.

FIG. 1 is schematic drawing of a typical incandescent bulb 1, and FIG. 2 is a plot 2 of the bulb's relative power output as a function of emergent angle. If the angular direction opposite the screw threads of the bulb is denoted as 0 degrees, then the relative power profile may look essentially constant over the range of 0 degrees, ±about 150 degrees. For angles outside this range, there is some falloff of the relative power, caused by a shadowing from the threaded stem of the bulb. The power profile reaches its minimum value around 180 degrees, or parallel to the threaded stem. The minimum value may be zero, or may be finite but non-zero.

One possible measure of the width of such a power distribution is the full-width-at-half-maximum (FWHM); other measures are possible, as well. A typical incandescent bulb may have an emission pattern with a FWHM of about 300 degrees. Using the angles as drawn in FIG. 1, a FWHM of 300 degrees means that the angular light output falls to half of its maximum value at angles of 210 degrees and 150 degrees. Note that for this general discussion, we ignore any differences in angular output between angles measured in the page of FIG. 1 and out of the page of FIG. 1.

In contrast with the relatively wide angular distribution of FIGS. 1 and 2, FIGS. 3 and 4 shows comparable angular power outputs from a typical LED module 3.

The LED module 3 includes a printed circuit board 6, a support platform 7, an emission surface 8, and a lens 9.

The printed circuit board 6 mechanically supports the LEDs and supplies electrical power to the LEDs. The printed circuit board 6 may include its own power supply, such as batteries, or may connect electrically to an external power supply. The printed circuit board 6 may include one or more threaded holes, through-holes, and/or locating features. The printed circuit board 6 may have any suitable shape, such as round, square, rectangular, hexagonal, and so forth.

The support platform 7 is optional, and may include the mechanical and electrical connections required to elevate the LEDs a suitable distance above the actual printed circuit board plane.

The emission surface 8 is the physical location of the light emitting diode plane. It is assumed that all the LEDs in the LED module 3 have their respective outputs emit from the same emission plane 8, although this need not be the case. In this application, the emission plane 8 is drawn as the topmost surface of three horizontally-oriented rectangles, which represent three adjacent LED facets, chips or dies. The LEDs may be arranged in an array, such as a 1 by 2, a 1 by 3, a 2 by 2, a 2 by 3, a 3 by 3, a single LED, or any other suitable number of LED facets. The LED array may be arranged in a rectangular pattern, or any other suitable pattern.

A lens 9 encapsulates the LED array. The lens may encapsulate all the LEDs in the emission plane, as drawn in FIG. 3, or may encapsulate fewer than all the LEDs in the emission plane. Alternatively, the lens 9 may be a series of lenses, each encapsulating its own LED in the emission plane.

In general, it is intended that many styles of commercially available packaged LEDs may be used as the LED module 3. For instance, one possible candidate for the LED module 3 is commercially available from Osram, and sold under the OSTAR name. Other products from Osram and from other manufacturers are available as well, and may equally well be used as the LED module 3.

Light emitted perpendicular to the LED array 3 is denoted as having an angle of 0 degrees, with angles of 90 degrees and 270 being parallel to the emission plane 8. A plot 4 of the relative power output from this LED array 3 shows a much more narrow distribution than the plot of FIG. 1. Here, the LED array 3 has its peak output at 0 degrees, with a falloff to essentially zero at 90 and 270 degrees.

In general, light emitted from a typical LED module 3 is found to have a generally Lambertian distribution in power per angle. A Lambertian distribution has a peak that is oriented normal to the emitting surface (often denoted as 0 degrees), with an angular falloff of cos θ, where θ is with respect to the surface normal. This Lambertian distribution may be represented numerically by a full-width-at-half-maximum (FWHM) in angle, given by $2 \cos^{-1}(0.5)$, or 120 degrees. Actual LED modules 3 may have angular distributions that vary slightly from the FWHM value of 120 degrees, such as in the range of about 90 degrees to about 130 degrees, but the 120 degree value is considered to be a generally good approximation, and is used accordingly throughout this document.

One known approach for having an angularly broad output from the LEDs is to distribute multiple LED sources over one or more non-planar surfaces, such as the outside of a sphere or cylinder. There is a line of commercially available products that use in their light engines outward-facing LED chips mounted around the circumference of a cylinder, which results in a beam width of about 275 degrees. These light engines are available in LED products from CAO Group in West Jordan, Utah.

There area several drawbacks to mounting the LEDs on a non-planar surface. First, such a mounting arrangement is complicated, time- and labor-intensive, and expensive. Second, such a mounting arrangement cannot use standard, offthe-shelf LED packages. Both of these drawbacks make the CAO Group approach less than optimal.

Another known approach is disclosed in U.S. Pat. No. 7,021,797, titled "Optical device for repositioning and redistributing and LED's light", issued on Apr. 4, 2006 to Juan C. Miñano et al. Miñano discloses an optical device for spatially displacing the output of a light-emitting diode (LED) and coupling the output to a predominantly spherical emission pattern produced at a useful height above the LED. The device of Miñano is made of a transparent dielectric material, such as an injection-molded plastic. It comprises a lower transfer section that receives the LED's light from below and an upper ejector section that receives the transferred light and spreads it spherically. One or more LEDs are optically coupled to the bottom of the transfer section, which operates by total internal reflection upon their entire hemispherical emission.

A potential drawback to the device of Miñano is that it is quite large, and has a significant longitudinal extent beyond the LED chips. One of the applications disclosed by Miñano is use of the device in a flashlight, where LEDs would radiate into the device, then the light output of the device would strike a parabolic mirror and leave the flashlight as a collimated beam. While such a device may be suitable for a flashlight, which already has a natural longitudinal shape, such a device may not be suitable for an incandescent-bulb replacement, which may fit in a much smaller spatial envelope.

Accordingly, there exists a need for an optical element that can use a planar LED module as a light source, can direct the relatively narrow light from the LED module into a relatively wide beam, and can fit in the relatively small spatial envelope required to "retrofit" existing incandescent fixtures.

BRIEF SUMMARY OF THE INVENTION

An embodiment is a device for angularly broadening light emitted from a light-emitting diode module, comprising: a lens having a symmetry about a longitudinal axis; the lens comprising a transparent material bounded by an exterior surface; the exterior surface comprising a batwing structure that converts a Lambertian input distribution of light rays emitted from the light-emitting diode module into a generally uniform output distribution of light rays emerging from the lens; the batwing structure comprising a proximal portion facing the light-emitting diode module, the proximal portion comprising: a concave portion at the center of the proximal portion, and a total internal reflection portion circumferentially surrounding the concave portion. Any light ray that enters the lens from the light-emitting diode module does so through the concave portion. Any light ray that enters the lens through the concave portion and directly strikes the total internal reflection portion does so at an incident angle greater than a critical angle for the lens.

Another embodiment is a device for broadening an angular light output of a light-emitting diode module, comprising: a lens for receiving light from the light-emitting diode module and emitting light into a plurality of exiting angles, the lens having a characteristic emission pattern wider than that of the light emitting diode module, the lens comprising a material having a refractive index greater than one, the material bounded by an exterior surface, a radial cross-section of the exterior surface comprising: a first linear section extending away from a longitudinal axis of the lens; a second substantially linear section adjacent to the first linear section and substantially parallel to the longitudinal axis of the lens; a third linear section adjacent to the second linear section and extending toward the longitudinal axis of the lens; and a curvilinear portion adjacent to the third linear section and extending toward the longitudinal axis of the lens, the curvilinear portion including a convex portion and a concave portion.

A further embodiment is a wide-angle light emission system, comprising: a generally planar light emitting diode module for emitting light in an angular distribution centered around a longitudinal axis, the longitudinal axis being substantially perpendicular to the light emitting diode module; and a lens for receiving light from the planar light emitting diode module The lens extends longitudinally away from the light emitting diode module and is disposed on only one side of the light emitting diode module plane. The lens has an inner longitudinal thickness proximate the longitudinal axis, an outer longitudinal thickness proximate an outer radial edge of the lens, and an intermediate longitudinal thickness between the longitudinal axis and the radial edge of the lens, the intermediate longitudinal thickness being greater than both the inner longitudinal thickness and the outer longitudinal thickness. The lens comprises a material having a refractive index greater than one, the material having an exterior surface, a radial cross-section of the exterior surface having a distal side facing away from the light emitting diode module, the distal side including both a distal convex portion and a distal concave portion, and having a proximal side facing toward the light emitting diode module, the proximal side including: a proximal concave portion at the center of the proximal side for receiving light from the light-emitting diode module; and a total internal reflection portion circumferentially surrounding the proximal concave portion for totally internally reflecting light that enters the lens through the concave portion and directly strikes the total internal reflection portion.

BRIEF DESCRIPTION OF THE SEVERAL VIEWS OF THE DRAWINGS

FIG. 1 is schematic drawing of a typical incandescent bulb.

FIG. 2 is a polar plot of relative power output as a function of emergent angle, for the bulb of FIG. 1.

FIG. 3 is schematic drawing of a typical light emitting diode (LED) module.

FIG. 4 is a polar plot of relative power output as a function of emergent angle, for the LED module of FIG. 3.

DETAILED DESCRIPTION OF THE INVENTION

An optical element is disclosed, for receiving relatively narrow light from a planar light-emitting diode (LED) source, and for redistributing the light into a relatively wide range of output angles that span a full 360 degrees. The element may be used to retrofit existing fixtures that were originally designed for incandescent bulbs with LED-based light sources that have similar emission profiles. The element is small enough so that it may be packaged along with an LED module and its control electronics in the volume envelope of an incandescent light bulb. An exemplary element is a single, transparent, rotationally-symmetric lens that has a batwing shape in cross-section, extending angularly away from a longitudinal axis. The lens also includes a variety of curved, straight, specular and, optionally, diffuse portions on its longitudinal and transverse faces, all of which cause a variety of internal and external reflections, refractions, and, optionally, scattering. As such, many of the specific lens features cannot be directly linked to specific optical effects at a particular angle; rather, the features all interact with each other to produce the wide-angle light output.

The preceding paragraph is merely a summary, and should not be construed as limiting in any way. A more complete description is provided in the figures and the text that follows.

Figure 5:
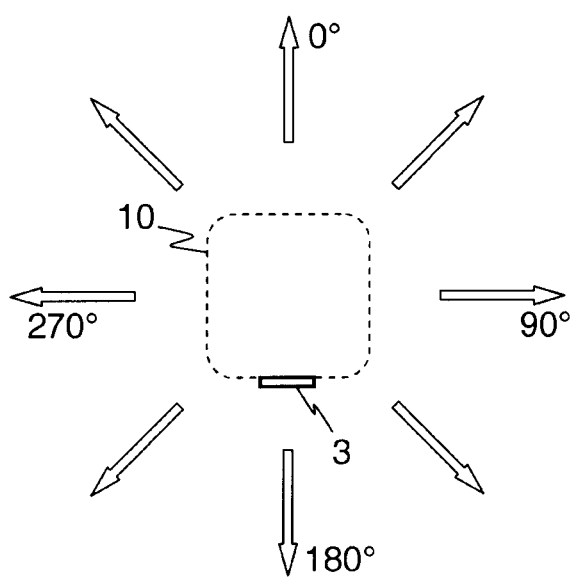
FIG. 5 is a schematic drawing of an optical element that receives the light emitted by an LED module and directs it into a full 360 degrees
Figure 6:
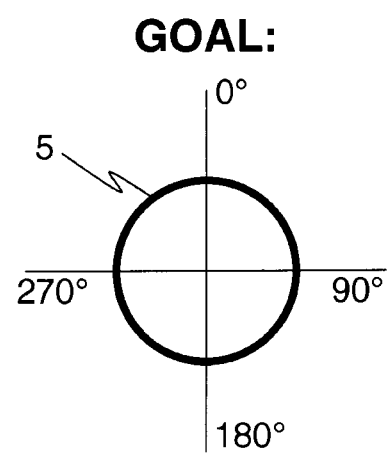
FIG. 6 is a plot of an idealized angular power output of the optical element of FIG. 5.

As stated above, it would be desirable to have an optical element that widens the relatively narrow angular output 4 of a planar LED module 3 to resemble the relatively wide angular output 2 of an incandescent bulb 1. FIG. 5 is a schematic drawing of such an optical element 10, which receives the light emitted by an LED module 3 and directs it into a full 360 degrees. FIG. 6 is a plot of an idealized angular power output of the optical element 10, which is essentially uniform over a full 360 degrees. This uniform output 5 is a design goal; in practice, there may be some non-uniformities to the angular output, which would show up as jaggedness in some or all portions of the circle in FIG. 6.

There are many possibilities for the optical element 10. Four such possibilities are described in detail below, and are denoted with element numbers 10A, 10B, 100 and 10D. All four are functionally equivalent to the "black box" optical element 10 shown in FIG. 5; they all receive relatively narrow light from an LED module 3 and redirect it into a relatively wide angular range that includes a full 360 degrees, as shown in the graph of the uniform output 5 of FIG. 6. Each of the four designs is described sequentially below.

Figure 7:
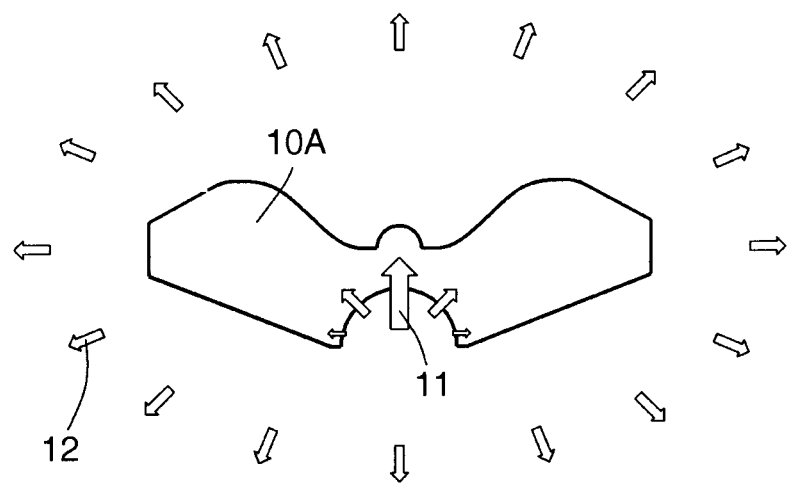
FIG. 7 is a cross-sectional schematic drawing of a batwing lens showing light input and output.

The first design for the optical element 10 is shown in the cross-sectional schematic drawing of FIG. 7. A lens 10A (also referred to herein as a batwing lens 10A) is rotationally symmetric about its longitudinal axis, and is batwing-shaped in a cross-section that includes the longitudinal axis. The lens 10A receives relatively narrow light 11 from an LED module (not shown). Through a variety of reflections, refractions and, optionally, scattering from the various surface features, the lens 10A produces a relatively wide output light distribution 12, which includes a full 360 degrees.

Note that the term "batwing" as used herein describes the shape of the cross-section of the lens itself, not an angular output from the lens. There are instances in the literature where "batwing lens" describes a lens that directs light strongly into two preferred directions (in cross-section), each on a side of a longitudinal axis; this is not the intended use of the term in the present application.

Figure 8:
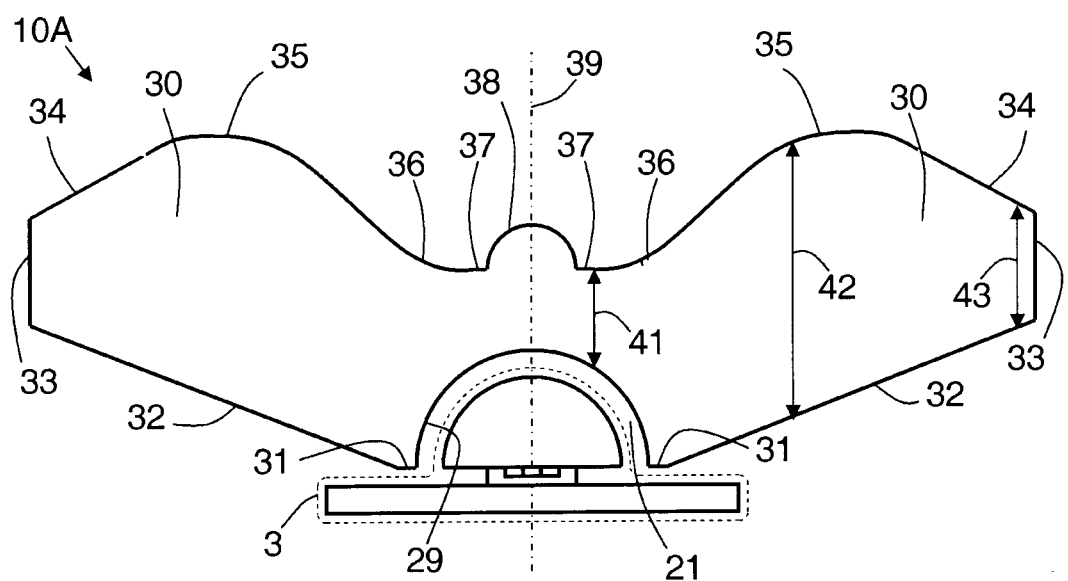
FIG. 8 is a cross-sectional schematic drawing of the batwing lens of FIG. 7.

FIG. 8 is a cross-sectional schematic drawing of the batwing lens 10A of FIG. 7, along with the LED module 3. There are many features on this lens 10A, and they are described below in order, starting at the LED module 3 and moving outward around the perimeter of the lens 10A.

For the purposes of this document, the side of the lens 10A facing the LED module 3 may be referred to as the "proximal" or "near" side, and the lens of the lens 10A facing away from the LED module 3 may be referred to as the "distal" or "far" side.

The LED module 3 shown in FIG. 8 is intended to be a generic LED module 3, which may be made by any number of manufacturers. Because a primary application for the lens 10A is for an incandescent light bulb, it is preferred that the LED module 3 emit white light. Alternatively, the lens may be used with an LED module having only a single color, or a plurality of discrete colors.

The white light in the LED may be generated in a number of ways. In some cases, the LED module includes a chip that emits light at a relatively short wavelength, such as blue, violet, or ultraviolet (UV). The blue LEDs have wavelengths that are typically in the range of about 440 nm to about 470 nm. Violet and UV LEDs have shorter wavelengths. A phosphor absorbs the short-wavelength light and emits wavelength-converted light, which can resemble white-light for illumination purposes. The specific color properties of the wavelength-converted light are largely determined by the chemical properties of the phosphor and the interaction of the phosphor with the short-wavelength light.

In some cases, the phosphor is located at the LED chip, so that the emission point of the wavelength-converted light is near the center of the hemisphere 9 (as opposed to being evenly distributed over the curved surface of the hemisphere, for instance). In some cases, the hemisphere 9 that encapsulates all the LED chips may be replaced with an individual lens on each LED chip.

The lens 10A includes a concave portion 29 on its proximal face, which is centered on the longitudinal axis 39 of the lens 10A. In some applications, the concave portion 29 is a hemisphere (also referred to herein as a concave hemisphere 29). It is expected that the batwing lens 10A should be able to accommodate many different configurations of LED modules 3, including many of the commonly sized LED hemispheres, so the precise configuration of the LED module 3 becomes relatively unimportant. In general, it may be desirable to situate the emission point of the LEDs at or near the center of this concave hemisphere 29, so that the rays that leave the LED module 3 strike the concave hemisphere 29 at roughly normal incidence, and therefore do not significantly bend from refraction at the surface. The interior of the concave portion 29 may be anti-reflection coated, such as with a quarter-wave of low-refractive index material, or may be left uncoated.

Adjacent to the hemispherical gap is a ridge 31. The ridge 31 may be roughly parallel to the LED module 3 (or, equivalently in this document, perpendicular to the longitudinal axis 39 of the lens 10A). In some cases, the ridge 31 is straight, although the ridge 31 may optionally have some curvature.

The ridge 31 may be used for mechanical purposes in attaching the lens 10A to the LED module 3. For instance, the ridge 31 may be forced into contact with the circuit board of the LED module 3, or a corresponding mechanical part on the circuit board, where the contact determines a longitudinal spacing between the lens 10A and the LED emission plane. Alternatively, there may be additional legs attached to the ridge 31 that may be used for spacing. Once a longitudinal spacing has been determined, the lens 10A and LED module 3 are fixed to each other by gluing, soldering, welding, screwing, snapping, or any other suitable attachment method. In some cases, the ridge 31 may serve primarily a mechanical function in the lens, although it may also include some optical effects.

Adjacent to the ridge 31 and radially farther out along a proximal longitudinal side of the lens 10A is a total internal reflection region 32. The primary purpose of the total internal reflection region 32 is to internally reflect some of the high-propagation-angle rays that leave the LED module 3. Note that total internal reflection 32 is effectively a 100% reflection, with no transmitted and no absorbed portion. There may be a small loss due to scattering from surface roughness, but otherwise, total internal reflection is effectively lossless.

Note that total internal reflection occurs when a ray strikes an interface at an angle greater than the critical angle. The critical angle is the angle at which the refracted ray would exit the interface parallel to the interface itself, or with a propagation angle of 90 degrees with respect to the surface normal. For a lens 10A with a refractive index given by "n", the critical angle inside the lens at a lens/air interface is given by $\sin^{-1}(1/n)$. In general, the total internal reflection region 32 is designed so that if a ray leaves the emission point of the LED module 3 and strike the total internal reflection region 32, it does so at greater than the critical angle.

In some cases, the total internal reflection region 32 may have a straight or substantially straight cross-section, as is shown in the cross-section of FIG. 8. Due to the rotationally symmetric nature of the lens 10A, the total internal reflection region 32 would then be a portion of a cone. In other cases, the total internal reflection region 32 may have one or more slightly curved portions, which may be convex and/or concave.

A secondary function of the total internal reflection region 32 is to transmit light that has undergone other reflections inside the lens 10A. The light path for rays inside the lens 10A is quite complicated, and rays having slightly different directions or locations may end up taking very different paths. In general, aside from the total internal reflection region 32, the functions of the other portions of the lens exterior do not have such clear, well-defined functions. Rather, they all cooperate to ensure that the exiting light includes a full 360 degree range. This cooperation between elements, or rather, the inability to separate the functions of many elements, is explored further below.

Adjacent to the total internal reflection region 32 is a lateral edge 33. In some cases, the lateral edge 33 may be straight, in cross-section, and may be parallel to the longitudinal axis 39 of the lens 10A. In other cases, the lateral edge 33 may be straight and inclined with respect to the longitudinal axis 39 of the lens 10A. In still other cases, the lateral edge 33 may include one or more curved portions, any or all of which may be convex or concave. Such curvature may be slight, so that the surface profile may deviate by only a few degrees at most from a truly straight edge.

Figure 13:
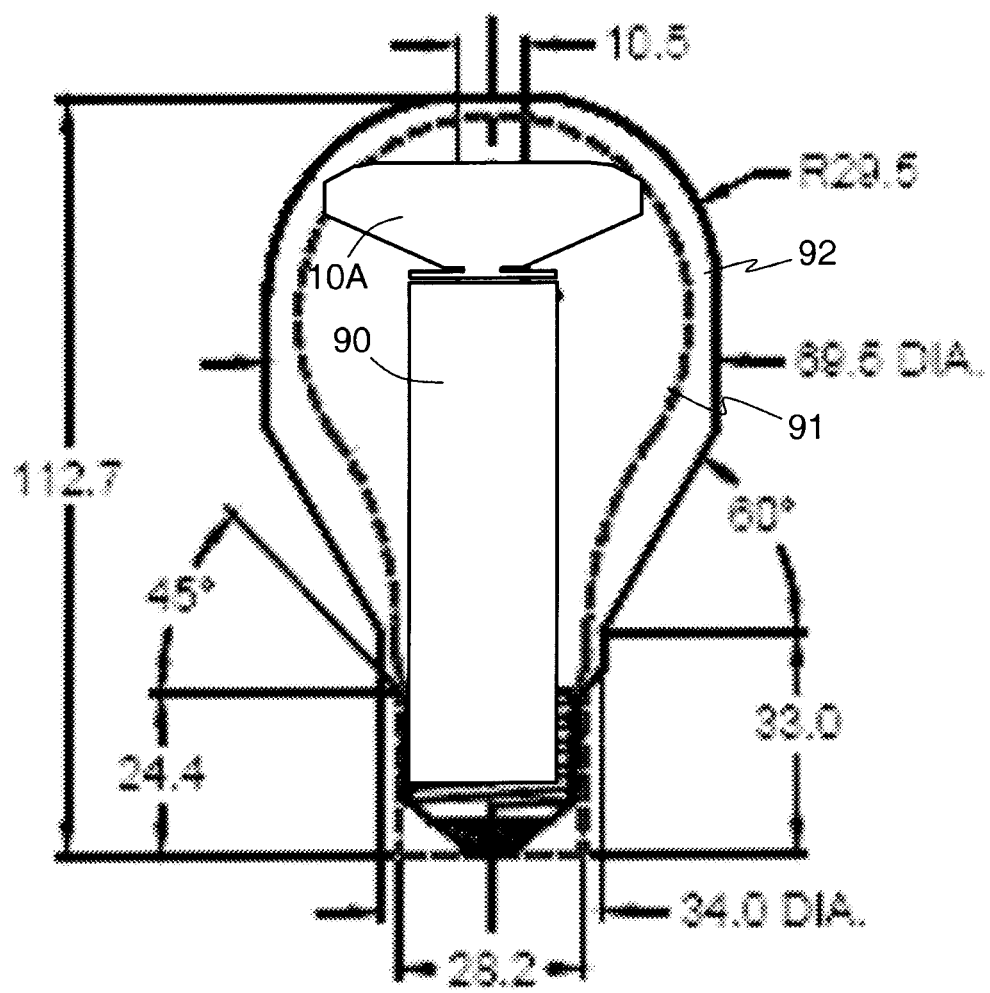
FIG. 13 is a schematic drawing of the lens and control electronics, overlaid with a dimensioned drawing of an exemplary volume envelope for an incandescent fixture.

In some cases, the lateral edge 33 defines a maximum radial dimension for the lens 10A. Such a dimension may be important if the lens 10A has to fit in a particular volume envelope, such as the volume envelope allocated for a typical incandescent bulb. Such a volume envelope is shown in FIG. 13 and described more fully in the accompanying text below.

Adjacent to the lateral edge 33, in order, are a distal straight portion 34, a distal convex portion 35, a distal concave portion 36, a distal lateral straight portion 37, and a distal central convex portion 38. As with the lateral edge 33, any or all of these may include one or more straight, convex or concave portions. The names of these portions 34-38 are given so for convenience, and should not be construed as limiting in any way.

In some cases, the distal-most edge of the lens 10A falls within the distal convex portion 35. Along with the lateral edge 33, this distal-most edge may define an exterior dimension for the lens 10A, which may be important if the lens is to fit inside a prescribed volume envelope.

The lateral edge 33, the distal straight portion 34 and the distal convex portion 35 may form a portion of the outer boundary of a so-called "batwing" for the lens 10A. Light that leaves the LED module 3 in a particular range of propagation angles (with respect to the longitudinal axis 39), such as 20 degrees to 70 degrees, 25 degrees to 65 degrees, 30 degrees to 60 degrees, and 35 degrees to 55 degrees, may enter the batwing portion directly, without any reflections off any other surfaces. In general, light that enters this batwing portion may propagate a significant distance within the lens 10A before exiting the lens 10A and being redirected to a prescribed angle. By "significant distance", we mean that the light may propagate farther in the batwing than in the purely longitudinal or purely transverse directions, by a factor of about 2 to about 5. These numerical ranges are approximations and generalizations, and should not be construed as limiting in any way.

The transitions between the following portions/edges form corners: the ridge 31 and the total internal reflection portion 32, the total internal reflection portion 32 and the lateral edge 33, the lateral edge 33 and the distal straight portion 34, and the distal lateral straight portion 37, and a distal central convex portion 38.

The transitions between the following portions are smooth and without corners: the distal straight portion 34 and the distal convex portion 35, the distal convex portion 35 and the distal concave portion 36, and the distal concave portion 36 and the distal lateral straight portion 37.

The lens 10A is shaped so that its maximum longitudinal thickness 42 is located laterally between a central thickness 41 and an edge thickness 43. In some cases, the lens 10A has its maximum thickness 42 located in the distal convex portion 35. In some cases, the central thickness 41 may be located at the longitudinal axis 39. In other cases, the central thickness 41 may be located slightly displaced away from the longitudinal axis 39, in any of the distal central convex portion 38, the distal lateral straight portion 37, or the distal concave portion 36.

In some cases, the distal central convex portion 38 may be spherical in shape. In other cases, the shape may be a conic, and/or may include one or more aspheric terms in its surface description. Such surface descriptions may follow the known conventions typically used for raytracing programs, and may include one or more polynomial terms for the surface description.

The distal convex portion 38 may be referred to as a "bump" 68. Such a "bump" 68 has a definable purpose with respect to particular ray directions: the bump 38 spreads out the peak for rays that are near parallel to the longitudinal axis 39. Alternatively, the single "bump" may be replaced by an array of smaller "bumps". As a further alternative, the "bump" may be removed entirely, and replaced with a roughened surface. Any of these alternatives also spreads out the peak for close-to-on-axis rays.

In some cases, for light emerging from the center of a hemispherical lens in the LED module 3, as drawn in FIG. 8, there are no portions of the exterior surface of the lens 10A that shade any other portions of the exterior surface; all portions of the lens exterior are "directly visible" from the center of the hemispherical lens. In other cases, some portions may shadow some other portions of the lens exterior.

The surface finish of the lens 10A is worth discussing. At one extreme, portions of the lens may have a well-polished surface, which may be considered "smooth". Such a smooth surface finish reduces scattered light for both reflected and refracted rays. A typical mirror has such a smooth finish, and reflections off a smooth finish may be considered to be "specular". A ray undergoing "specular" reflection or "specular" refraction follows the well-known laws of reflection and refraction at the smooth surface, where a single ray striking the surface produces only a single ray direction reflecting off and/or refracting through the surface.

At the other extreme, portions of the lens may have a roughened surface, which may be considered "rough". Rough surfaces may act as diffusers, in a similar manner to frosted glass. A ray striking such a rough surface may reflect or refract into a "cloud" of rays that emerge from the surface, rather than a single, specular reflected or refracted ray.

There is a continuum of surface roughness between completely smooth (specular) and completely rough (diffuse). Of particular interest is a surface roughness that shall be denoted as "slightly roughened", which may be functionally defined as follows. A ray refracting or reflecting from a slightly roughened surface leaves the surface with its specular refracted or reflected direction, plus or minus a given number of degrees. For instance, if a ray were to reflect off a specular surface and leave with an angle of 36 degrees, a reflection off a similarly-oriented slightly roughened surface would leave in a "cloud" of rays in the range of 36±2 degrees, or 36±5 degrees, or 36±10 degrees, or any other suitable range. In general, the rougher the surface, the larger the range of exiting angles. Note that the range may also be in two dimensions, so that the "cloud" of rays includes a cone of angles, centered around a specular angle. The surface roughness may be expressed as a single RMS value, or as a single peak-to-valley value, or as a variety of values that each correspond to a particular spatial frequency. In general, the relationship between surface roughness and the angular range imparted to refracting or reflecting rays is well-known from light scattering theory.

Any or all portions 31-39 of the lens 10A may have this slightly roughened surface, and the roughness may optionally vary from location to location on the exterior of the lens 10A. In some cases, such a slight roughness may help smooth out some of the peaks in the angular distribution of light leaving the lens 10A. In some cases, this smoothing is beneficial.

Aside from the surface roughness, the overall design of the lens 10A may be scaled up or down without significantly changing the lens's angular output. Because the lens is scalable, the size of the lens may be related to the diameter of a hemispherical lens 9 in the LED module 3. More specifically, the ratio of the external lateral diameter of the lens to the hemisphere 9 diameter may kept constant as the lens is scaled up or down. For LED modules having a hemisphere 9 diameter of 10 mm, the external lateral diameter of the lens may be about 50 mm, providing a ratio of 5:1. This ratio of 5:1 is merely an example, and other suitable ratios may fall in the ranges of between 10:1 and 2:1, between 7:1 and 3:1, between 6:1 and 4:1, between 5.5:1 and 4.5:1, and about 5:1. There is a further discussion of external lens size in FIG. 13, and the text accompanying FIG. 13 below.

The light ray paths from the LED module 3, through the lens 10A, and out of the lens 10A, may be quite complicated, depending on the location and direction of the particular light ray. For instance, a light ray leaving the LED module 3 toward the smooth region between the distal convex portion 35 and the distal concave portion 36 may undergo total internal reflection at the distal exterior surface of the lens 10A, and may then be total-internally reflected multiple times as it follows the contour of the convex portion 35 and follows the distal straight portion 34 until it strikes the lateral portion 33. Such complicated ray paths are quite location and angle-dependent; note that a ray striking the other ends of the distal convex portion 35 and the distal concave portion 36, away from their smooth intersection point, may lead to simply the ray refracting out of the lens 10A, with a small reflected portion remaining within the lens 10A. In general, such ray behavior is well understood and is accurately simulated by known raytracing software, even though it may be difficult to state in path-independent terms.

It is worth explaining why some regions are straight, some are convex, some are concave, and why the boundaries between such regions fall where they do. The raytracing simulation requires a mathematical surface description of some sort, which is provided to the raytracing program by a designer. The designer selects the characteristics of each portion of the external surface, such as "straight and connecting two particular points", "convex and matching first derivatives to the adjacent portions", and so forth. The raytracing program typically has a graphical or a text-driven way of entering the characteristics of each portion, and of entering a starting numerical value for each portion. The numerical value may be one or more (x, y, z) coordinates in the portion, which may represent an endpoint or other internal point, such as a midpoint of the portion. The numerical values may then be allowed to vary within particular ranges, while a particular merit function is evaluated. The merit function may be the peak-to-valley power per angle leaving the lens 10A, as a function of angle, or any other suitable merit function. The merit function is repeatedly evaluated while one or more numerical values is varied, so that an optimization may occur. Such optimizing is well-known from raytracing programs.

The actual layout of lens 10A, as shown in FIG. 8, is the result of optimization by the raytracing program. It should be noted that certain designers may constrain the lens 10A differently during optimization, which may lead to different characteristics in certain portions other than the ones shown in FIG. 8 and described above. For instance, one or both of the distal convex portion 35 and the distal concave portion 36 may be replaced with one or more straight portions, each of which may form a corner at one or both ends. Alternatively, both the distal convex portion 35 and the distal concave portion 36 may be replaced by a series of small, straight portions which, taken together, form a stepwise approximation of the truly curved convex and concave portions 35 and 36. This may also be true for any of the other regions or portions along the exterior of the lens 10A; a curved portion may replace a corner or a straight portion, and vice versa. In general, the choice of surface portion characteristics is generally left to the designer.

Despite the choices left to the designer, there are a few generalities that may be made concerning the overall shape of the lens 10A. First, light enters the lens 10A from an LED module 3 through a centrally-located concave portion 29 on the proximal side of the lens. In some applications, the concave portion 29 is a hemisphere, and the LED module effective emission point is at the center of the hemisphere. In those cases, the LED-emitted light strikes the concave portion 29 at normal incidence inside the hemisphere. Second, a radial cross-section of the lens 10A includes two batwings 30, each being on opposite sides of the longitudinal axis 39 and each extending in the same longitudinal direction away from the LED module 3. The distance from the LED module 3 to the far edge of the batwing 30 may be larger than the on-axis longitudinal thickness of the lens 10A, by a factor of about two to about five, or a factor less than two or greater than five. Third, the batwing 30 has a maximum longitudinal thickness 42 that occurs between the center thickness 41 and the edge thickness 43 of the batwing, rather than at the center thickness 41 or at the edge thickness 43. Fourth, the proximal edge of the batwing 30 (on the side of the LED module) is formed by a total internal reflection portion 32. Light that leaves the LED module 3 and directly strikes the total internal reflection portion 32 is totally internally reflected within the lens 10A and proceeds down the batwing 30 away from the LED module 3. Fifth, the ratio of the lateral diameter of the lens (formed at lateral edge 33) to the diameter of a hemisphere 20 in the LED module 3 may be in any of the following ranges: between 10:1 and 2:1, between 7:1 and 3:1, between 6:1 and 4:1, between 5.5:1 and 4.5:1, and about 5:1.

It is worth devoting a few paragraphs to discussing the physics that govern the light ray behavior inside and outside the lens. We assume that the lens 10A is made from a material having a refractive index of "n" and has no thin film coatings on its exterior.

A light ray that strikes the exterior surface of the lens, whether it be from air into the lens or the lens into air, is referred to as an "incident ray". There is an "incident medium", which where the incident ray resides (either the lens or in air), and an "exiting medium" on the opposite side of the interface (i.e., either air or the lens, respectively). There is an "incident angle" associated with this incident ray, which is given numerically by the angle between the ray propagation vector and the local surface normal.

There is a "reflected ray" that propagates inside the incident medium, away from the interface. The law of reflection dictates that the reflected angle equals the incident angle, where the reflected and incident angles are each made with the local surface normal.

If the incident medium is the lens (i.e., the incident ray is inside the lens), then there is a characteristic angle known as the critical angle, given numerically by $\sin^{-}(1/n)$. For incident angles greater than the critical angle, there is no transmitted ray on the opposite side of the interface, and 100% of the optical power is reflected at the interface in a phenomenon known as "total internal reflection".

For incident angles less than the critical angle, a fraction of the light is transmitted as a "transmitted ray", and a fraction is reflected as the reflected ray. The direction of the transmitted ray is dictated by Snell's Law. For our lens 10A, Snell's Law says that the sine of the ray propagation angle outside the lens equals "n" times the sine of the ray propagation angle inside the lens, where both propagation angles are formed with respect to the surface normal.

The amount of power contained in the transmitted (i.e. refracted) and reflected rays is given by the well-known Fresnel transmission and reflection coefficients. For normal incidence, the Fresnel power reflectivity is given by the value $[(n-1)/(n+1)]^2$. For a typical refractive index of n=1.5, the power reflectivity is 4%. The power transmissivity is 100% minus the power reflectivity, or 96%. For angles other than normal incidence, the power reflectivity and transmissivity both depend on incident angle, but do so in a known manner that may be looked up in any standard optics text. Such power calculations are handled implicitly by all raytracing programs, and a designer using such a raytracing program will most likely never need the explicit expressions for the reflected and transmitted power.

Thus far, the discussion has focused on the structural and functional elements of lens 10A. The following is a discussion of a simulated performance of lens 10A.

Figure 9:
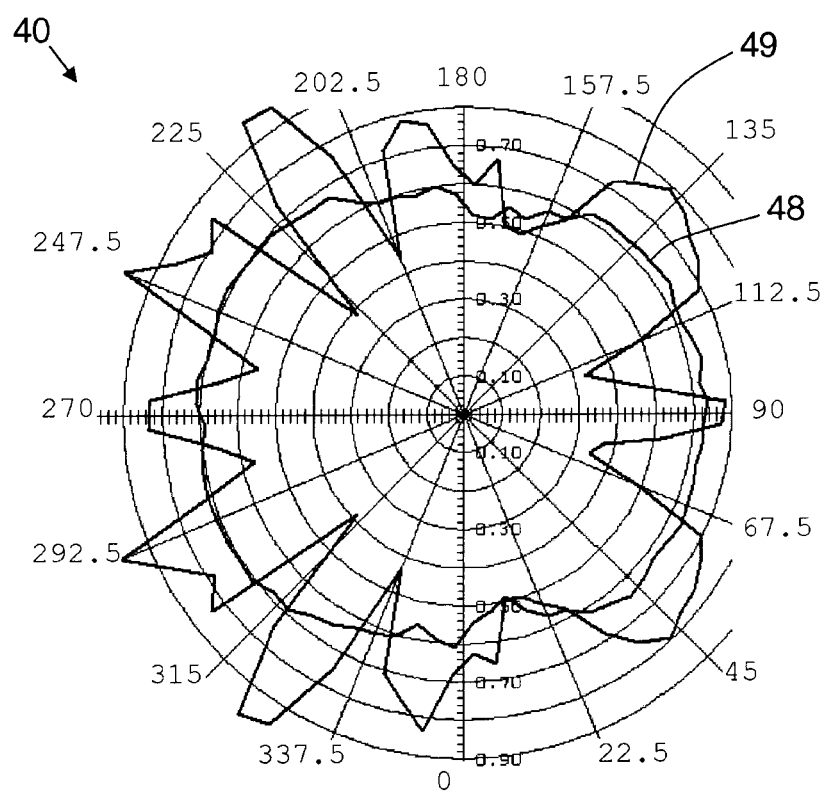
FIG. 9 is a polar plot of the simulated emitted power per angle as a function of angle, for the lens of FIGS. 7 and 8.

FIG. 9 is a polar plot 40 of the simulated emitted power per angle as a function of angle, for the lens 10A of FIGS. 7 and 8. A simulated light intensity distribution plot 49 is for emissions and angles within the plane of the page, as shown in FIGS. 1-7, for a "slice" parallel to longitudinal axis 39. Plot 48 is for emissions and angles out of the page, for a "slice" perpendicular to the longitudinal axis 39.

For the simulated light intensity distribution plot 49 of FIG. 9, the average value is about 70%, the minimum value is about 35%, and the maximum (peak) value is 100%. The units are arbitrary, since it is the relative performance as a function of angle that matters most for the lens 10A. From these simulation results, we may say that the intensity is uniform in all directions, +/−50%. Other acceptable average values are in the range of 65% to 75%, 60% to 80%, 55% to 85%, 50% to 90%, 50% to 99%, 75% to 85%, and 80% to 85%, 85% to 90%, 90% to 95%, and about 91%. Other acceptable minimum values are in the range of 30% to 40%, 25% to 45%, 20% to 50% 15% to 55%, 10% to 80%, 5% to 90%, 80% to 85%, 75% to 85%, 75% to 80%, and about 82%. The peak value is always 100%, using the conventions above.

Plot 48 shows variation azimuthally, around the longitudinal axis 39 of the lens. This intensity value is highly uniform, and shows little variation over the full 360 degrees. In practice, any deviations from truly uniform arise from asymmetry in the LED array (square or rectangular vs. circular), and numerical artifacts from raytracing through the lens.

Figure 10:
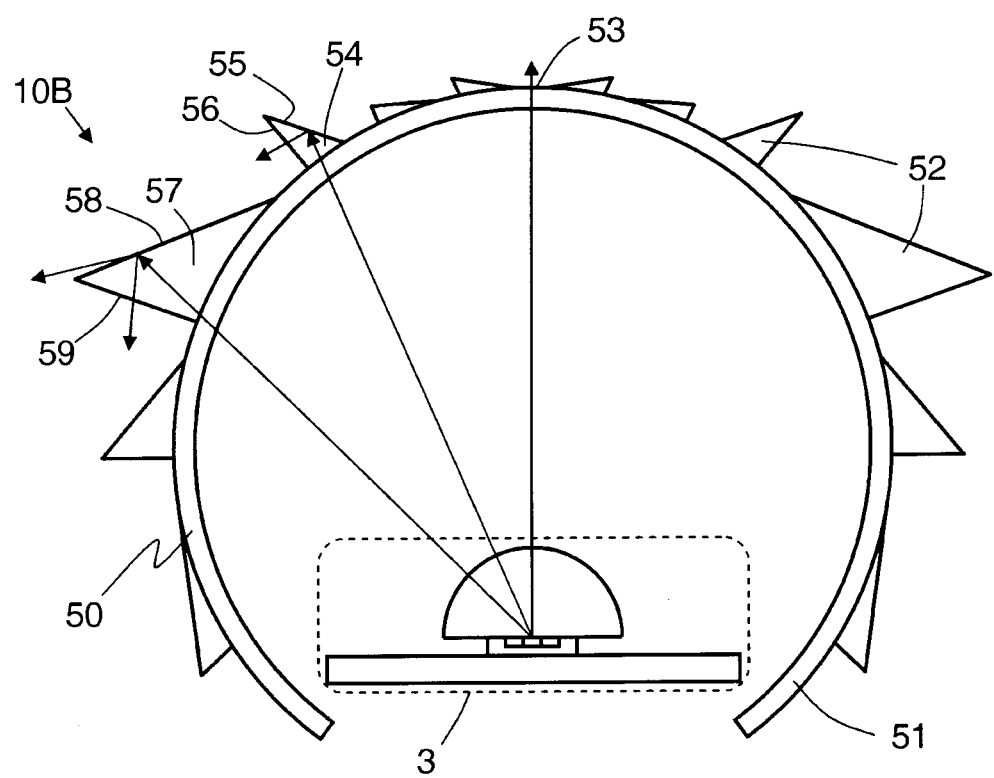
FIG. 10 is a cross-sectional schematic drawing of a prismatic element.

We turn to a second design for the optical element 10. FIG. 10 is a cross-sectional schematic drawing of a prismatic element 10B. The prismatic element 10B is a concentric shell lens 50, which may be a transparent, spherical shell. The concentric shell lens 50 includes several prism elements 52, 54, 57 (also referred to hereinafter as prisms 52, 54, 57) that can redirect light rays emitted from the LED module 3.

The shell lens 50 includes bare portions 51, where light may simply pass through the lens 50. For instance, ray 53 is simply transmitted through a bare portion of the shell lens 50.

The shell lens 50 also includes a variety of prisms 52, 54 and 57. The prisms may be made integral with the shell body, or may be made separately and then attached to the shell body. An exemplary light ray enters prism 54, totally internally reflects off prism hypotenuse 55, and exits the prism through face 56. A second exemplary light ray enters prism 57, tramsits a portion through face 58, reflects a portion (not by total internal reflection, since the ray strikes the face 58 at less that the critical angle), the reflected portion leaving the prism through face 59. Other ray paths are possible, which can include refraction, transmission, reflection, and total internal reflection.

The prism and shell faces may be coated, or may be left bare, and may optionally be textured or roughened, or left smooth. The prism shapes, spacing and positions may vary from those shown in the exemplary FIG. 10.

Figure 11:
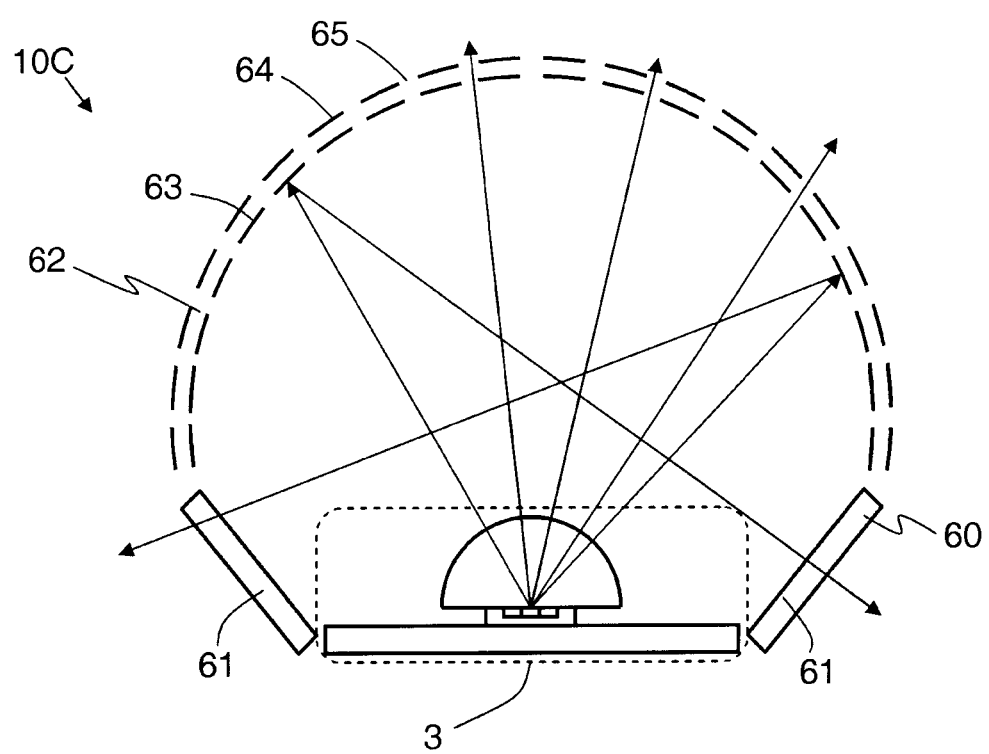
FIG. 11 is a cross-sectional schematic drawing of a shell reflector.

A third design for the optical element 10 is shown in FIG. 11, which is a cross-sectional schematic drawing of a reflector element 10C that is a shell reflector 60. Light from the LED module 3 either passes through a hole 65 in the shell reflector, or reflects off a reflective interior face 63 of the shell reflector. Any light reflected off the interior face 63 is recycled. Light may pass through a transparent housing 61. The shell may include one or more sheets 62, such as an interior face 63 and an exterior face 64. The faces may have their holes aligned, or may have their holes misaligned, so that light may bounce around in the interior of the shell (i.e., between faces 63 and 64) before exiting through a hole in the exterior face.

In some applications, the shell reflector 60 may be considered analogous to a "shiny colander" for light, where the colander surface itself may be smooth, rough, diffuse or textured. A diffuse surface may appear white, rather than shiny.

Figure 12:
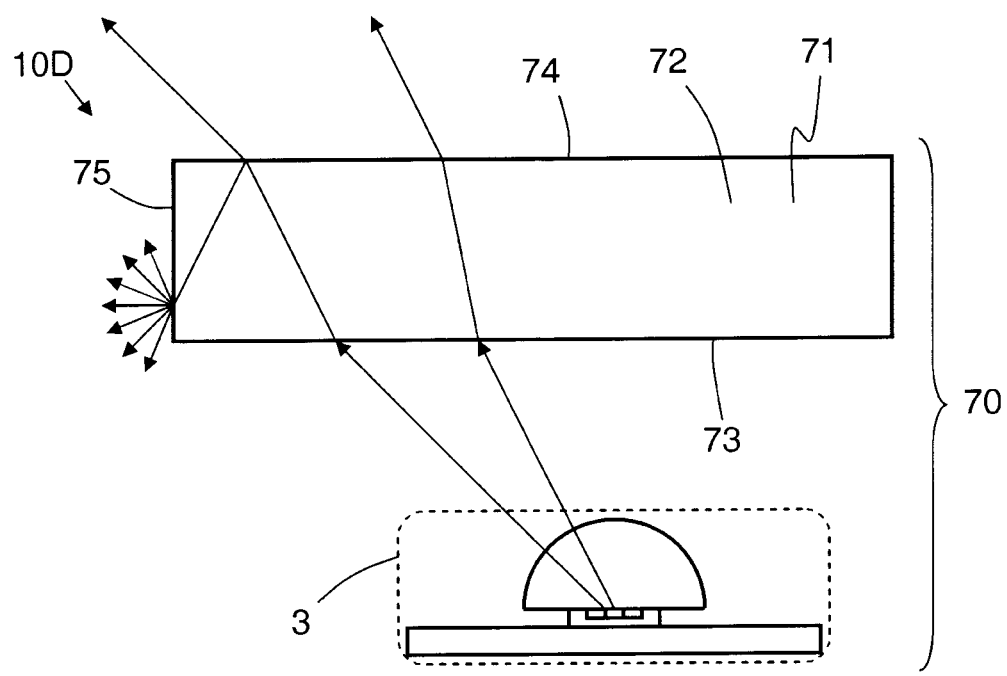
FIG. 12 is a cross-sectional schematic drawing of a plate redirector.

FIG. 12 shows a fourth design 10D for the optical element 10, and is a cross-sectional schematic drawing of a plate redirector 70. The plate redirector 70 has light emitted from an LED module 3 incident of a plate 71. Based on the thin film and surface roughness designs for the proximal surface 73 of the plate 71, a portion of the light is transmitted into the plate 71, and a portion is reflected (not shown). Likewise, the light reaching the distal surface 74 of the plate also is transmitted and reflected in portions, depending on the thin film and surface roughness designs for the distal surface 74 of the plate 71. Light striking the lateral sides 75 of the plate may experience scattering, depending on the surface roughness of the lateral side 75, which may be the same or different from the surface roughness elsewhere on the plate 71. The interior 72 of the plate may be glass, plastic, or any other suitable plate material.

Because it is desirable to fashion the LED light source as a retrofit for an existing incandescent bulb fixture, it is beneficial to examine the relevant dimensions of the optical element 10. Specifically, we examine the dimensions of the lens 10A, as compared with an ANSI-specified volume envelope for an incandescent bulb.

FIG. 13 is a schematic drawing of the lens 10A and driver electronics 90, overlaid with a dimensioned drawing of an exemplary volume envelope for an incandescent fixture. Dotted line 91 represents the size of a typical incandescent bulb, with envelope 92 showing the volume allotted for a typical incandescent bulb shown by the dotted line 91. It is desirable that the lens 10A and the driver electronics 90 fit within the envelope 92. Dimensions are in millimeters.

The lens 10A has a lateral diameter of 50 mm, and can accommodate an LED module that includes a 10 mm-diameter primary lens (i.e., hemisphere 9). The driver electronics 90 occupy a cylindrical volume having a diameter of 23 mm and a length of 78 mm. Both the lens 10A and the driver electronics 90 may be fit into a bulb-like fixture having screw threads, as shown in FIG. 13.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A device comprising:
a light-emitting diode module with a Lambertian light output;
a lens made of a transparent material and having symmetry about a longitudinal axis, the lens comprising:
an interior surface proximate the light-emitting diode module and having a concave portion centered on the longitudinal axis, such that any light entering the lens from the light emitted from the light-emitting diode module enters through the concave portion, the interior surface further having a total internal reflection portion circumferentially surrounding the concave portion, such that any light ray that enters the lens through the concave portion and directly strikes the total internal reflection portion does so at an incident angle greater than a critical angle for the lens; and
an exterior surface facing away from the light-emitting diode module and through which light exits the lens, the exterior surface having a lateral edge and a distal curvilinear portion further including a distal convex portion and a distal concave portion, the distal convex portion defining a maximum distal longitudinal extent of the lens;
wherein the interior and exterior surfaces define a batwing-shaped structure;
the lens converting light rays emitted from the light-emitting diode module into a generally uniform output distribution of light rays emerging from the lens;
wherein the lens includes an inner longitudinal thickness proximate the longitudinal axis, an outer longitudinal thickness proximate the lateral edge of the exterior surface, and an intermediate longitudinal thickness between the longitudinal axis and the lateral edge and thus between the inner Longitudinal thickness and the outer Longitudinal thickness, the intermediate longitudinal thickness being greater than both the inner longitudinal thickness and the outer longitudinal thickness.

2. The device of claim 1, wherein the lens has a rotational symmetry about the longitudinal axis.

3. The device (10) of claim 1, wherein the generally uniform output distribution (5) of light rays emerging from the lens (10A) comprises:
a first plurality of light rays that enter the lens (10A) through the concave portion (29) and then directly exit the lens (10A) through the batwing structure; and
a second plurality of light rays that enter the lens (10A) through the concave portion (29), internally reflect at least once from the batwing structure, then exit the lens (10A) through the batwing structure.

4. The device of claim 1, wherein the concave portion of the interior surface is hemispherical in shape and wherein any light ray that enters the lens from the light-emitting diode module (3) does so at normal incidence through the concave portion of the interior surface.

5. The device of claim 1, wherein the exterior surface includes at least one bump on a distal portion opposite the interior surface, the at least one bump being proximate the longitudinal axis.

6. The device of claim 1, wherein the lateral edge is parallel to the longitudinal axis and is directly adjacent to the total internal reflection portion.

7. The device of claim 1, wherein a ratio of a lateral diameter of the lens, divided by a diameter of the concave portion is in the range of 6:1 and 4:1.

* * * * *